3,013,074
TETRACYCLINE PURIFICATION PROCESS
Joseph A. Kardys, Groton, Conn., assignor to Chas. Pfizer & Co., Inc., New York, N.Y., a corporation of Delaware
No Drawing. Filed May 23, 1960, Ser. No. 31,225
6 Claims. (Cl. 260—559)

This invention is concerned with the purification of tetracycline, and more particularly with a new process for the preparation of highly refined tetracycline base by crystallization.

As is well known, tetracycline may be produced by several methods, including catalytic reduction of chlortetracycline and fermentation by selected microorganisms in suitable nutrient media. In either case the product must be isolated from solution and separated from accompanying impurities. A variety of procedures for accomplishing this have been described in the literature. For example, the aqueous antibiotic solution may be treated with a combination of barium and magnesium salts and adjusted to basic pH to precipitate an antibiotic metal complex, as described in U.S. Patent 2,831,878 issued to Ensiminger et al. The antibiotic is recovered from the solid complex by extraction with aqueous acid and the extract is neutralized to cause separation of tetracycline base. Other procedures have also been described, including extraction of the tetracycline activity into an organic solvent such as butanol or methyl isobutyl ketone, followed by reextraction into aqueous acid and neutralization to precipitate tetracycline base.

Such procedures ordinarily provide a crude tetracycline which must be further purified before being formulated into the finished dosage form. This is accomplished with remarkable efficiency by the present invention, which provides for crystallization of the impure tetracycline from aqueous alcohol solution in the presence of dissolved citric acid or certain of its salts. It has been discovered that this procedure unexpectedly reduces both organic and inorganic impurities to a remarkably low level and provides excellent yields of highly purified tetracycline. According to a further embodiment of the invention, this crystallization is carried out in the presence of specified low concentrations of dissolved urea, which further provides denser, drier product crystals which filter with particular ease and which are characterized by remarkably bland taste. It will be apparent that the new processes of the present invention furnish significant savings in cost and improvements in product quality.

The alcohols which may be employed in the new purification process include alkanols of up to three carbon atoms or monoalkyl ethers of ethylene glycol having a total of 3 to 4 carbon atoms. Such alcohols include methanol, ethanol, n-propanol, isopropanol, ethylene glycol monomethyl ether and ethylene glycol monoethyl ether. Methanol and ethylene glycol monoethyl ether are particularly preferred. The alcohol selected is preferably employed in admixture with water. A wide range of proportions of alcohol to water may be successfully utilized as the crystallization solvent. Particularly good results have been achieved with aqueous solutions of from about 15 to about 50% by volume of ethylene glycol monoethyl ether. The solubility of the antibiotic will naturally vary somewhat, depending on the particular alcohol selected and the proportion of water employed, and this is readily determined by experiment. With the aqueous ethylene glycol monoethyl ether solutions described above, from about 2.5 to about 3.5 ml. of the alcohol (dry basis) per gram of tetracycline base activity is generally found to be adequate.

The tetracycline may be dissolved in the aqueous alcohol by suitable pH adjustment with a mineral acid such as hydrochloric or sulfuric acids. Ordinarily a pH between about 1.0 and 1.5 will be satisfactory. The antibiotic solution may now be advantageously filtered to remove insoluble impurities and, if desired, this filtration may be preceded by treatment with one or more solid purifying agents such as activated carbon.

The impure antibiotic solution is treated with a citrate, which may consist of citric acid or an alkali-metal or ammonium citrate such as a mono-, di- or trisodium, -potassium, -lithium or -ammonium citrate. While a wide range of citrate concentrations confer beneficial effects, for best results it is preferred to employ at least about 3 millimoles of citrate per gram of tetracycline base activity, and it is ordinarily unnecessary to employ more than about 20 millimoles. Even higher citrate concentrations may of course be employed, up to the limit of citrate solubility, but usually no additional advantage is achieved. Excellent results are ordinarily obtained with about 10 millimoles of citrate per gram of tetracycline. The citrate may be added dry and then dissolved in the solution, or it may be added as a water solution.

The product crystallizes from solution at a pH between about 2.5 and 9.5, and pH's between about 4 and about 5.5 are particularly preferred. Depending on the particular citrate employed and the final pH desired, it may or may not be necessary to add alkali. If citric acid is employed, addition of a base will usually be required to achieve the final pH. An alkali such as sodium or potassium hydroxide is suitable. After pH adjustment the mixture is stirred until crystallization is substantially complete and the product is separated, suitably by centrifuging or filtration. The purified tetracycline crystals may be washed with water to displace mother liquor and then dried.

When the described procedure is employed, remarkable improvements in product purity are effected. Ash content is reduced from levels of as high as 3–10% to values below 0.4%, and often to below 0.1%. In addition, the process removes organic impurities such as may be detected by a simple methanol solubility test. According to one convenient procedure, a gram of tetracycline is dissolved in a mixture of 25 ml. methanol and 1 ml. of 3 N hydrochloric acid, and the solution is inspected for clarity. Whereas the crude tetracycline may often contain resinous or oily organic impurities which are insoluble under the test conditions, the highly purified products of the new process dissolve completely to form clear solutions. If the crystallization is attempted in the absence of citrate the product usually fails to pass this test. Although the mechanism of this advantageous effect is not fully understood, it is vertified by repeated test.

Tetracycline is recovered by the new process of the present invention in excellent yields, usually above 90%. This is particularly surprising in view of reports that have appeared describing the epimerization of tetracyclines in the presence of citrate ion. It is reported, for example, in Journal of the American Chemical Society, volume 79, page 2849 (1957) that citrate ion accelerates epimerization of tetracyclines in solution at pH values between about 2 and 6. In spite of this information, which would tend to discourage the use of citrates in tetracycline purification, remarkably high yields are provided by the new process.

In a further embodiment of the invention, it is found that if the described crystallization is conducted in the presence of minor concentrations of dissolved urea the crystalline product is denser, drier, and filters more rapidly. Furthermore, the product which results has a particularly bland taste which renders it especially suitable for oral liquid dosage forms. For best results, at least about 1 millimole of urea is employed per gram of tetracycline activity, although beneficial effects may sometimes be obtained at even lower levels. It is preferable that no more than about 6 millimoles of urea per gram be employed since at materially higher levels some urea may appear in the product. About 2 millimoles per gram usually provides very favorable results. The urea may be added to the crystallization solution in dry form and then dissolved, or it may be incorporated in the form of a water solution. Addition may be made at any time prior to crystallization, and it is usually convenient to add the citrate and urea together. Crystalline tetracycline base recovered from the citrate-urea solutions often has a moisture content of about 20–30%, whereas if the urea is omitted moisture levels of 50% or more are frequently obtained.

The process steps described may be carried out over a broad range of temperatures, conveniently ranging, for example, from about 5° to about 35° C. Temperatures above or below this range may also be employed, but there is ordinarily no advantage in providing the additional heating or cooling. If extended delays are anticipated during processing it is a reasonable precaution to employ the lower temperatures, from about 5 to about 15° C., for example, to minimize decomposition losses. Otherwise, room temperature will usually be most convenient.

If desired, acid addition salts, such as the hydrochloride, may be prepared from the purified tetracycline of the present invention by conventional procedures. The tetracycline base may, for example, be dissolved in a suitable solvent, treated with a mole of hydrochloric acid, and crystallized in the form of the salt.

The following examples are provided by way of illustration and should not be interpreted as limiting the invention, many variations of which are possible without departing from the spirit or scope thereof.

Example I

Crude amorphous tetracycline base containing about 4% ash and about 55% water is prepared in the following manner: Broth containing about 5000γ tetracycline per ml., from submerged aerobic Streptomyces fermentation, is adjusted to pH 2.5 with sulfuric acid and filtered. The filtrate is then adjusted to pH 8 with sodium hydroxide in the presence of about 5% W/V diatomaceous earth filter aid. The solids are filtered off and resuspended in water (5 ml. per gram total solids). After adjustment to pH 1.2 with sulfuric acid and treatment with decolorizing carbon, the slurry is filtered to yield a 70,000γ per ml. solution. The latter is adjusted to pH 4.5 with sodium hydroxide and the crude base, having a potency of about 400γ per mg., is separated by filtration.

The tetracycline is purified as follows: 500 grams of the crude antibiotic are dissolved in a mixture of 600 ml. ethylene glycol monoethyl ether and 800 ml. water, by adjusting the pH to about 1.2 with concentrated hydrochloric acid. The solution is then decolorized by stirring for 15 minutes with 15 grams of activated carbon and filtered with 30 grams diatomaceous earth filter aid. The cake is washed with 200 ml. water and the combined filtrate and wash slowly added to a solution of 600 grams trisodium citrate dihydrate and 30 grams urea in a liter of water. The pH rises to about 4 and the product is crystallized at about 10° C. while stirring for about 2 hours. The crystals are readily separated by filtration, washed with 200 ml. cold water, and repulped in 600 ml. cold water. The repulp is filtered and the product washed with an additional 100 ml. water. The moisture content of the resulting dense tetracycline crystals is reduced from about 25% to about 10% by drying at 60° C. Overall yield from crude base is about 94%. The product has an ash content of about 0.06% and is characterized by unusually bland taste. It gives a clear solution in the methanol solubility test described hereinabove.

Example II

The procedure of Example I is repeated without employing urea. The crystallized product gives a clear solution in the methanol solubility test and has about the same ash content as the product of Example I. Products which pass the methanol solubility test and have ash contents below 0.4% are also obtained by crystallizing from aqueous solutions of from 15 to 50% by volume of ethylene glycol monoethyl ether.

Example III

The procedure of Example I is repeated in a series of experiments, with the substitution of the following proportions of citrate and urea for the trisodium citrate and urea of the earlier example:

| Citrate | Citrate Level, millimoles per gm. of tetracycline | Urea Level, millimoles per gm. of tetracycline | Crystallization, pH |
|---|---|---|---|
| citric acid | 3 | 2 | 2.5 |
| monosidum citrate | 3 | 6 | 4.0 |
| disodium citrate | 20 | 1 | 4.5 |
| tripotassium citrate monohydrate | 10 | 2 | 9.5 |
| trilithium citrate tetrahydrate | 10 | 2 | 7.0 |
| diammonium citrate | 10 | 3 | 4.0 |

In each case the product is crystallized at the indicated pH by addition of sodium hydroxide where necessary. The products exhibit the desirable characteristics of the product of Example I.

Example IV

The procedure of Example I is again repeated in a series of experiments, substituting one of the listed alcohols for the ethylene glycol monoethyl ether of the earlier experiment:

methanol  
ethanol  
n-propanol  
isopropanol  
ethylene glycol monomethyl ether Low-ash products which pass the methanol solubility test are obtained in each case.

Example V

Amphoteric tetracycline is recovered from fermentation broth following the procedure of Example IV of U.S. Patent 2,831,878, by treatment of the filtered broth with barium and magnesium chlorides, followed by filtration at pH 8.5, extraction of the filter cake with water at pH 1.5, and adjustment of the acid extract to pH 4.5. The crude antibiotic which separates is recovered by filtration and purified by the crystallization procedure of Example I, above, addition of the activated carbon being omitted. The resulting dense, crystalline tetracycline base passes the methanol solubility test and has an ash content below 0.4%.

What is claimed is:

1. The process of purifying tetracycline which comprises crystallizing said antibiotic from an impure solution thereof in aqueous alcohol by maintaining the pH of said solution between about 2.5 and 9.5, said alcohol being selected from the group consisting of alkanols having up to 3 carbon atoms and ethylene glycol monoalkyl ethers having a total of 3 to 4 carbon atoms, said solution having dissolved therein a citrate selected from the group consisting of citric acid, alkali metal citrates, and ammonium citrates at a concentration of at least about 3 millimoles per gram of tetracycline base activity.

2. The process of claim 1 wherein said alcohol is ethylene glycol monoethyl ether.

3. The process of claim 1 wherein said alcohol is methanol.

4. The process of claim 1 wherein said citrate is employed at a concentration between about 3 and about 20 millimoles per gram of tetracycline base activity.

5. The process of purifying tetracycline which comprises crystallizing said antibiotic from an impure solution thereof in aqueous alcohol by maintaining the pH of said solution between about 2.5 and 9.5, said alcohol being selected from the group consisting of alkanols having up to 3 carbon atoms and ethylene glycol monoalkyl ethers having a total of 3 to 4 carbon atoms, said solution having dissolved therein a citrate selected from the group consisting of citric acid, alkali metal citrates, and ammonium citrates at a concentration between about 3 and about 20 millimoles per gram of tetracycline base activity, and urea at a concentration between about 1 and about 6 millimoles per gram of tetracycline base activity.

6. The process of purifying tetracycline which comprises dissolving said antibiotic in an aqueous solution of from about 15 to about 50% by volume of ethylene glycol monoethyl ether at a pH of from about 1.0 to about 1.5, filtering said solution, treating resulting filtrate with about 10 millimoles of a citrate selected from the group consisting of citric acid, alkali metal citrates and ammonium citrates and about 2 millimoles of urea per gram of tetracycline base activity and crystallizing tetracycline by adjusting the pH to from about 4 to about 5.5.

References Cited in the file of this patent

UNITED STATES PATENTS

| | | |
|---|---|---|
| 2,905,662 | Smith | Sept. 22, 1959 |
| 2,929,837 | Ogawa et al. | Mar. 22, 1960 |